(12) United States Patent
Exnar et al.

(10) Patent No.: US 8,357,468 B2
(45) Date of Patent: Jan. 22, 2013

(54) CARBON COATED LITHIUM MANGANESE PHOSPHATE CATHODE MATERIAL

(75) Inventors: Ivan Exnar, Itingen (CH); Thierry Drezen, Cugy (CH); Marketa Zukalova, Prague (CH); James Miners, Prague (CH); Otakar Frank, Prague (CH); Ladislav Kavan, Prague (CH)

(73) Assignee: Dow Global Technologies LLC, Midland, MI (US)

( * ) Notice: Subject to any disclaimer, the term of this patent is extended or adjusted under 35 U.S.C. 154(b) by 633 days.

(21) Appl. No.: 12/665,968

(22) PCT Filed: Jul. 3, 2008

(86) PCT No.: PCT/IB2008/052678
§ 371 (c)(1),
(2), (4) Date: Dec. 22, 2009

(87) PCT Pub. No.: WO2009/010895
PCT Pub. Date: Jan. 22, 2009

(65) Prior Publication Data
US 2010/0178562 A1    Jul. 15, 2010

(30) Foreign Application Priority Data

Jul. 13, 2007    (EP) .................................. 07112490

(51) Int. Cl.
*H01M 4/52*    (2010.01)
*H01M 4/88*    (2006.01)

(52) U.S. Cl. ..................... 429/221; 429/224; 429/231.5; 429/231.8; 252/182.1

(58) Field of Classification Search .......... 429/209–232; 252/182.1
See application file for complete search history.

(56) References Cited

U.S. PATENT DOCUMENTS

| | | |
|---|---|---|
| 5,871,866 A | 2/1999 | Barker et al. |
| 5,910,382 A | 6/1999 | Goodenough et al. |
| 6,391,493 B1 | 5/2002 | Goodenough et al. |
| 6,514,640 B1 | 2/2003 | Armand et al. |
| 6,528,033 B1 | 3/2003 | Barker et al. |
| 6,632,566 B1 | 10/2003 | Yamada et al. |
| 6,699,623 B1 | 3/2004 | Dai |
| 6,716,372 B2 | 4/2004 | Barker et al. |
| 6,749,967 B2 | 6/2004 | Li et al. |
| 6,811,764 B2 | 11/2004 | Jorgensen et al. |
| 6,811,924 B2 | 11/2004 | Hosoya et al. |

(Continued)

FOREIGN PATENT DOCUMENTS

| | | |
|---|---|---|
| CN | 1677718 | 10/2005 |
| WO | 2007049815 | 5/2007 |

(Continued)

OTHER PUBLICATIONS

Andersson, A.S., et al., Journal of Power Sources, 97-98 (2001) 498-502, The Source of First-cycle Capacity Loss in LiFePO4.

(Continued)

*Primary Examiner* — Milton I Cano
*Assistant Examiner* — Ling R Zeng

(57) ABSTRACT

The present invention concerns a carbon coated lithium metal phosphate material containing a manganese oxide layer between the LiMnPO4 material or the C/LiMn$_{1-x}$Z$_x$PO$_4$ material, where Z=Fe, Co, Ni, Mg, Ca, Al, Zr, V, Ti and x=0.01-0.3, and the carbon layer.

12 Claims, 2 Drawing Sheets

U.S. PATENT DOCUMENTS

| | | |
|---|---|---|
| 6,815,122 B2 | 11/2004 | Barker et al. |
| 7,029,795 B2 | 4/2006 | Li |
| 7,087,346 B2 | 8/2006 | Barker et al. |
| 7,189,475 B2 | 3/2007 | Sasaki et al. |
| 7,217,474 B2 | 5/2007 | Yamada et al. |
| 7,261,979 B2 | 8/2007 | Gozdz et al. |
| 7,276,218 B2 | 10/2007 | Barker et al. |
| 7,285,260 B2 | 10/2007 | Armand et al. |
| 7,338,734 B2 | 3/2008 | Chiang et al. |
| 7,348,101 B2 | 3/2008 | Gozdz et al. |
| 7,457,018 B2 * | 11/2008 | Armand et al. ............ 429/221 |
| 7,550,098 B2 | 6/2009 | Barker et al. |
| 7,700,236 B2 | 4/2010 | Yang |
| 2004/0121232 A1 | 6/2004 | Kato et al. |
| 2004/0157126 A1 | 8/2004 | Belharouak et al. |
| 2004/0241546 A1 | 12/2004 | Hatta et al. |
| 2005/0196673 A1 | 9/2005 | Biensan et al. |
| 2006/0035150 A1 | 2/2006 | Audemer et al. |
| 2006/0172195 A1 | 8/2006 | Wixom et al. |
| 2006/0257307 A1 | 11/2006 | Yang |
| 2007/0054187 A1 | 3/2007 | Nuspl et al. |
| 2009/0305132 A1 | 12/2009 | Gauthier et al. |

FOREIGN PATENT DOCUMENTS

| | | |
|---|---|---|
| WO | 2007113624 | 10/2007 |

OTHER PUBLICATIONS

Bernard, M.; et al., J. Electrochem. Soc., vol. 140, No. 11, Nov. 1993, 3065-3070, Electrochromic Reactions in Manganese Oxides.

Chen, C.H., et al., Journal of the Electrochemical Society, 148 (1), A102-A104 (2001), Studies of Mg-Substituted $Li_{4-x}Mg_xTi_5O_{12}$ Spinel Electrodes ($0 \leq x \leq 1$) for Lithium Batteries.

Delacourt, C., et al., Chem. Mater. 2004, 16, 93-99, One-Step Low-Temperature Route for the Preparation of Electrochemically Active $LiMnPO_4$ Powders.

Delacourt, C., et al., Journal of the Electrochemical Society, 152(5) A913-A921 (2005), Toward Understanding of Electrical Limitations (Electronic, Ionic) in $LiMPO_4$ (M=Fe, MN) Electrode Materials.

Fey, G., et al., Solid State Ionics 148 (2002) 291-298, The Effect of Varying the Acid to Metal Ion Ratio R on the Structural, Thermal, and Electrochemical Properties of Sol-gel Derived Lithium Nickel Cobalt Oxides.

Hu, Y., et al., Journal of the Electrochemical Society, 151(8) A1279-1285 (2004), Electrochemical Performance of Sol-Gel Synthesized $LiFePO_4$ in Lithium Batteries.

Huang, H., et al., Electrochemical and Solid-State Letters, 4 (10) A170-A172 (2001), Approaching Theoretical Capacity of $LiFePO_4$ at Room Temperature at High Rates.

Julien, C., et al., Spectrochimica Acta Part A 60 (2004) 689-700, Lattice Vibrations of Manganese Oxides, Part I. Periodic Structures.

Kim, T., et al., Journal of Physics and Chemistry of Solids 68 (2007) 1203-1206, Synthesis of Lithium Manganese Phosphate Nanoparticle and its Properties.

Kwon, N., et al., Electrochemical and Solid-State Letters, 9 (6) A277-A280 (2006), Enhanced Electrochemical Performance of Mesoparticulate $LiMnPO_4$ for Lithium Ion Batteries.

Lutz, H., et al., Journal of Solid State Chemistry, 90, 54-60 (1991), Lattice Vibration Spectra. LIX. Single Crystal Infrared and Raman Studies of Spinel Type Oxides.

Mi, C., et al. Journal of the Electrochemical Society 152 (3) A483-A487, (2005), In Situ Synthesis and Properties of Carbon-Coated $LiFePO_4$ as Li-Ion Battery Cathodes.

Myung, S., et al., Electrochimica Acta, 49 (2004) 4213-4222, Emulsion Drying Synthesis of Olivine $LiFePO_4$/C Composite and its Electrochemical Properties as Lithium Intercalation Material.

Padhi, A., et al., J. Electrochem. Soc., vol. 144, No. 4, Apr. 1997, 1188-1194, Phospho-olivines as Positive-Electrode Materials for Rechargeable Lithium Batteries.

Prosini, P., et al., Solid State Ionics 148 (2001)45-51, Determination of the Chemical Diffusion Coefficient of Lithium in $LiFePO_4$.

Prosini, P., et al., Electrochimica Acta 48 (2003) 4205-4211, Long-term Cyclability of Nanostructured $LiFePO_4$.

Shi, S., et al., Physical Review B, 68, 195108-1 through 5 (2003), Enhancement of Electronic Conductivity of $LiFePO_4$ by Cr Doping and its Identification by First-Principles Calculations.

Srinivasan, V., et al., Journal of the Electrochemical Society, 151 (1) A1517-A1529 (2004), Discharge Model for the Lithium Iron-Phosphate Electrode.

Herle, P., et al., Nature Materials, vol. 3, Mar. 2004, 147-152, Nano-Network Electronic Conduction in Iron and Nickel Olivine Phosphates.

Chung, S., et al., Nature Materials, vol. 1, Oct. 2002, 123-128, Electronically Conductive Phospho-Olivines as Lithium Storage Electrodes.

Tarascon, J., et al., C.R. Chimie 8 (2005) 17-26, On the Benefits of Ball Milling Within the Field of Rechargeable Li-Based Batteries.

Yamada, A., et al., Journal of the Electrochemical Society, 148 (3) A224-A229 (2001), Optimized $LiFePO_4$ for Lithium Battery Cathodes.

Yamada, A., et al., Journal of the Electrochemical Society, 148 (8) A960-A967 (2001), Crystal Chemistry of the Olivine-Type $Li(Mn_yFe_{1-y})PO_4$ and $(Mn_yFe_{1-y})PO_4$ as Possible 4 V Cathode Materials for Lithium Batteries.

Yazami, R., et al., Journal of Power Sources 54 (1995) 389-392, High Performance $LiCoO_2$ Positive Electrode Material.

Yonemura, M., et al., Journal of the Electrochemical Society, 151 (9) A1352-1356 (2004), Comparative Kinetic Study of Olivine $Li_xMPO_4$ (M-Fe, Mn).

Xiao-Yan Chang, et al., Chinese Journal of Power Sources, Research and Design, Synthesis and Performance of $LiMn_{1-x}Fe_xPO_4$ Used as Cathode Material for Lithium Ion Batteries, vol. 29, No. 10, Oct. 2005, pp. 1-7.

* cited by examiner

CARBON COATED LITHIUM MANGANESE PHOSPHATE CATHODE MATERIAL

FIELD OF THE INVENTION

The present invention relates to electrochemically active materials for batteries, in particular for lithium batteries. It more precisely relates to lithium manganese phosphate materials coated with a carbon layer.

STATE OF THE ART

Cathode materials that will reversibly intercalate lithium have been studied extensively in recent years for use as electrode materials in advanced high energy density batteries and they form the cornerstone of the emerging lithium-ion battery industry.

Lithium ion batteries are prepared from one or more lithium electrochemical cells which include a negative electrode (anode), a positive electrode (cathode) and an electrolyte for facilitating movement of ionic charge carriers between the negative and positive electrodes. The electrodes use two different insertion compounds: one type for the active cathode and one type for the anode materials. Insertion compounds are those that act as a solid host for the reversible insertion of guest atoms. In a lithium-ion battery, lithium is extracted from the cathode material while lithium is concurrently inserted into the anode on charge of the battery. Lithium atoms travel, or "rock", from one electrode to the other in the form of ions dissolved in a non-aqueous electrolyte.

Recently, lithium transition-metal (ortho) phosphates have attracted attention as potential Li-ion battery cathode materials due to their lower toxicity, lower cost and better chemical and thermal stability, when compared to the currently used $LiCoO_2$. Oxygen ions in the olivine structure form strong covalent bonds with $P^{5+}$ and $PO_4^{3-}$ tetrahedral polyanions to stabilize the three-dimensional framework[1]. Other lithium transition metal oxides such as $LiCoO_2$, $LiNiO_2$, $LiMnO_2$ and $LiMn_2O_4$ suffer from significant capacity fade during cycling. This is attributed to structural rearrangements caused during extraction and re-insertion. $LiMnPO_4$ offers a redox potential of 4.1 V vs. $Li^+/Li$[1, 2], which is considered to be the maximum limit accessible to most liquid electrolytes. Unfortunately lithium manganese phosphate suffers from a low intrinsic electronic and ionic conductivity and hence poor discharge rate capability. The electrochemical performance is especially poor at high current densities, which is the result of slow lithium diffusion kinetics within the grains and the low intrinsic electronic conductivity[3, 4]. To improve its rate performance, one approach is to increase the intrinsic electronic conductivity through cation doping[5-7]. However, the effect of doping has been questioned as the increase of electronic conductivity may arise from the presence of conductive impurities in the samples prepared at high temperature[8].

Another approach is to minimize the particle size of the olivine material[9, 10] thereby reducing the diffusion path length for lithium ions in the cathode material and establishing a large contact area with conductive additives such as carbon[11-13].

Delacourt et al.[14] synthesized 100 nm diameter particles of $LiMnPO_4$ by precipitation, which enhanced the reversible capacity to 70 mAh/g at C/20 from only 35 mAh/g for 1 μm diameter particles. Yonemura et al.[4] reached 150 mAh/g of discharge capacity at C/100 with small particles, close to the theoretical capacity of 170 mAh/g. Kwon et al.[15] also reported the electrochemical performance of sol-gel process prepared $LiMnPO_4$ with various particle sizes in the range of 140 to 160 nm and obtained reversible capacity of 156 mAh/g at C/100. Thus it is evident that particle size is critical in determining useful lithium capacity and charge/discharge rates[16-18]. So far, the production of mesoparticulate $LiMPO_4$ (M=Fe, Mn) remains a challenge and only a few groups have successfully produced materials of appropriate dimensions to yield the desired electrochemical performance in lithium ion batteries. Hereford a novel approach is required to improve electrochemical performances for this type of electrode materials. According to the present invention, the creation of a specific interface on the $LiMnPO_4$ material appears to be the best tool to improve electrochemical activity of $LiMnPO_4$ material.

GENERAL DESCRIPTION OF THE INVENTION

The primary object of this invention is to provide new materials having advantageous electrochemical properties and being useful as electrochemically active materials.

The invention provides an electroactive lithium manganese phosphate material ($LiMnPO_4$) or doped $LiMn_{1-x}Z_xPO_4$ (where Z=Fe, Co, Ni, Mg, Ca, Al, Zr V, Ti and x=0.01-0.3) material characterized in that it comprises a manganese oxide layer on the $LiMnPO_4$ material, respectively the $LiMn_{1-x}Z_xPO_4$ material.

In one embodiment of the invention, the manganese oxide described above is between the $LiMnPO_4$ material, respectively the $LiMn_{1-x}Z_xPO_4$ material, and a conductive additive such as carbon.

In one embodiment of the invention, the manganese oxide described above is either $Mn_3O_4$ (hausmannite), β-$MnO_2$ (pyrolusite), MnO (manganosit), MnOOH (groutit) or $Mn1.85O.6H_2O$ (birnessite).

In a preferred embodiment, the carbon coated lithium manganese phosphate $C/LiMnPO_4$ material according to the present invention contains a manganese oxide layer whose concentration is 0.01-5%.

In another embodiment of the invention, the manganese oxide layer between the $LiMnPO_4$ material and the conductive additive such as carbon is prepared by oxidizing of $LiMnPO_4$.

The lithium manganese phosphate $LiMnPO_4$ material according to the present invention contains $LiMnPO_4$ material with a particle size from about 10 nm to about 1000 nm.

In one embodiment of the invention, the electrode material described above is obtained by a process including steps where particles of $LiMnPO_4$ are milled with carbon under air atmosphere.

In a preferred embodiment, the electrode material is obtained following the process described above where water addition is also used.

In a particularly preferred embodiment, the electrode material is made following the process mentioned above furthermore including a heat treatment from 130° C. to 300° C., preferably from about 200° C. to 250° C.

Another object of the present invention is to provide a rechargeable battery comprising the material according to the invention.

An other object of the invention is to provide an electrochemical device comprising: (a) an anode, a cathode, and an electrolyte in contact with and separating the anode and cathode; (b) a cathode current collector in electronic communication with the cathode; and (c) an anode current collector in electronic communication with the anode, wherein at least one of the anode and cathode comprises an electroactive carbon coated material having the chemical formula C/LiM- $nPO_4$ or $C/LiMn_{1-x}Z_xPO_4$, where Z=Fe, Co, Ni, Mg, Ca, Al, Zr, V, Ti and x=0.01-0.3, wherein it comprises a manganese oxide interface layer between the $LiMnPO_4$ material, respectively the $LiMn_{1-x}Z_xPO_4$ material, and the carbon layer.

Another object of the present invention is to provide a process for manufacturing the materials described above.

In one embodiment of the invention, the manganese oxide layer can be created by partially oxidation of $LiMnPO_4$ with oxidising agent like ozone, Nitronium tetrafluoroborate, etc, by coating of $LiMnPO_4$ particles with manganese oxide layer or by direct high energy milling with carbon under air conditions.

In a preferred embodiment of the invention, the process used to produce the materials according to the present invention includes steps where particles of $LiMnPO_4$ are ball milled under air atmosphere.

In a particularly preferred embodiment, the process described above is carried out under wet conditions. The preferred liquid is water or LiOH solution in weight content ranges from about 0.5% to about 20%, preferably from 3% to 10%, more preferably at 8%.

In a more particularly preferred embodiment of the invention, the process described above is followed by a heat treatment. The applied temperature ranges from 130° C. to 300° C. for 2 to 20 hours, preferably from 200° C. to 250° C. for 12 hours, more preferably at 230° C. for 12 hours. The heating period is from 2 to 20 hours, preferably 12 hours.

DETAILED DESCRIPTION OF THE INVENTION

The present invention will be described in detail with examples supported by figures.

TABLES

Figure 1:
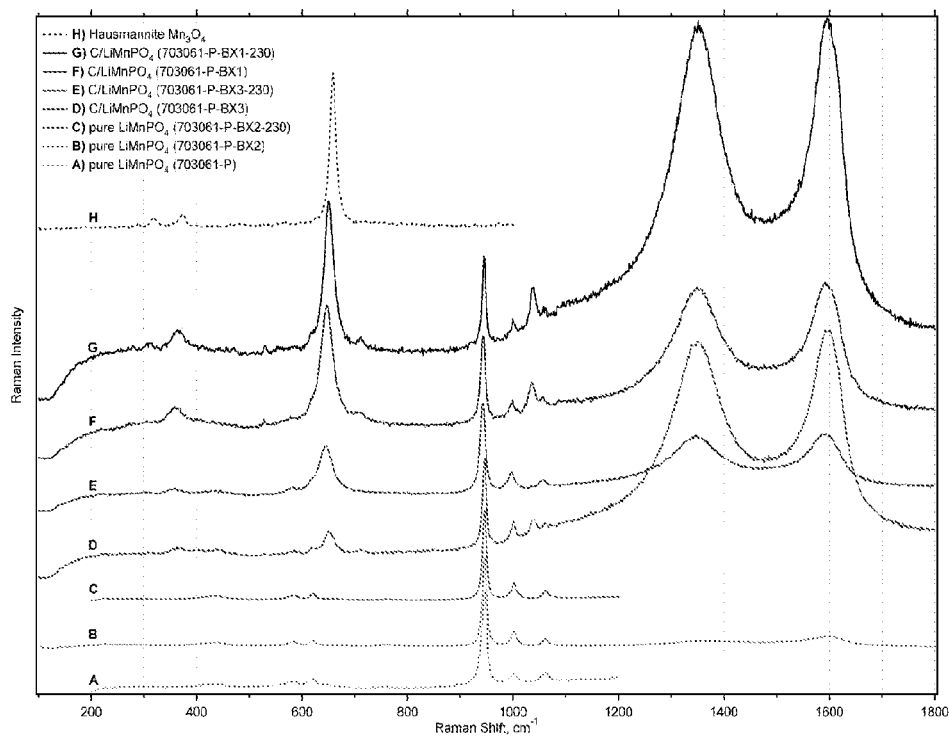
FIG. 1 shows Raman spectra of all measured samples excited by 514.5 nm laser.

Table 1 gathers the different materials under study.

Table 2 summarizes Raman bands of the measured samples and comparison to the literature. The bands assignment: $v_2$ a $v_4$—symmetric and asymmetric bend of $PO_4$, $v_1$ a $v_3$—symmetric and asymmetric stretch of $PO_4$; intensities: vw—very weak, w—weak, m—medium, s—strong.

TABLE 1

| Sample Name | Composition | Comments |
| --- | --- | --- |
| 703061-P | $LiMnPO_4$ | Pure $LiMnPO_4$ prepared by the "polyol" synthesis |
| 703061-P-BX1 | $C/LiMnPO_4$ composite (20% C) | $C/LiMnPO_4$ prepared by ball milling in humidified condition (3.2% of water) |
| 703061-P-BX1-230 | $C/LiMnPO_4$ composite (20% C) | $C/LiMnPO_4$ prepared by ball milling in humidified condition (3.2% of water) dried at 230° C. overnight |
| 703061-P-BX2 | $LiMnPO_4$ | Pure $LiMnPO_4$ prepared by the "polyol" synthesis, ball milled in humidified condition for 4 h without carbon |
| 703061-P-BX2-230 | $LiMnPO_4$ | Pure $LiMnPO_4$ prepared by the "polyol" synthesis, ball milled in humidified condition for 4 h without carbon and then dried at 230° C. overnight |
| 703061-P-BX3 | $C/LiMnPO_4$ composite (20% C) | $C/LiMnPO_4$ prepared by ball milling in dried condition |
| 703061-P-BX3-230 | $C/LiMnPO_4$ composite (20% C) | $C/LiMnPO_4$ prepared by ball milling in dried condition and dried at 230° C. overnight |
| $Mn_3O_4$ | $Mn_3O_4$ | commercial $Mn_3O_4$ (hausmannite) powder, Aldrich 97% |

TABLE 2

| $LiMnPO_4$ 703061-P | $C/LiMnPO_4$ 703061-P-BX1-230 | | $LiMnPO_4$ Ref.[1] | $Mn_3O_4$ $Mn_3O_4$ (exp.) | | Ref.[6] | $\beta$-$MnO_2$ Ref.[6] | | Assignment |
| --- | --- | --- | --- | --- | --- | --- | --- | --- | --- |
|  |  |  | 315 vw | 319 | w | 300-310 | 319 | vw |  |
|  |  |  | 366 vw | 371 | w | 350-360 | 377 | vw |  |
| 412 vw | 410 | w |  |  |  |  |  |  | $v_2$ |
| 438 vw | 442 | m | 430 vw |  |  |  |  |  | $v_2$ |
|  |  |  | 470 vw | 480 | vw | 485 | 486 | w |  |
|  |  |  | 525 w |  |  |  | 538 | s |  |
|  |  |  |  | 567 | vw | 579 |  |  |  |
| 575 w | 580 |  | 580 vw |  |  |  |  |  | $v_4$ |
| 586 w | 590 | w |  |  |  |  |  |  | $v_4$ |
| 625 w | 626 | m | 620 sh |  |  |  |  |  | $v_4$ |
|  |  |  | 652 s | 658 | s | 650-668 | 665 | s |  |
|  |  |  | 720 vw |  |  |  | 750 | vw |  |
| 760 vw |  |  |  |  |  |  |  |  |  |
| 945 s | 948.5 | s | 945 |  |  |  |  |  | $v_1$ |
|  | 999 |  |  |  |  |  |  |  |  |
| 1003 w | 1006 | m | 1000 vw |  |  |  |  |  | $v_3$ |

TABLE 2-continued

| LiMnPO$_4$ 703061-P | C/LiMnPO$_4$ 703061-P-BX1-230 | LiMnPO$_4$ Ref.[1] | Mn$_3$O$_4$ Mn$_3$O$_4$ (exp.) | Ref.[6] | β-MnO$_2$ Ref.[6] | Assignment |
|---|---|---|---|---|---|---|
| 1015 sh | 1018 w | | | | | $v_3$ |
| | | 1040 w | | | | |
| 1061 vw | 1067 m | 1058 vw | | | | $v_3$ |
| 1075 sh | 1080 w | | | | | $v_3$ |
| | | | 1350 s | | | D |
| | | | 1600 s | | | G |

The following examples are intended to be merely illustrative of the present invention, and not limiting thereof in either scope or spirit.

EXAMPLES

Synthesis of LiMnPO$_4$/C Material Using a Process According to the Invention In a first step, pure LiMnPO$_4$ (703061-P) was prepared by a process known from the prior art. For example, the international patent application WO 2007/049815 disclosed a method for manufacturing LiMnPO$_4$ having an excellent crystalline and a high purity. An other example of process is disclosed in the international patent application WO 2007/113624 and described "polyol" synthesis of pure LiMnPO$_4$.

Example 1

The LiMnPO$_4$/carbon composite (703061-P-BX3) was obtained by high energy milling of LiMnPO$_4$ with carbon black under air atmosphere.

16 g of powder of LiMnPO$_4$ and 4 g of carbon black (Ketjenblack EC-600-JD—SSA≈1500 m$^2$/g) was placed in a 250 mL stainless steel container. A high energy milling with a planetary ball mill (Retsch PM4000) using 9 stainless steel balls of 20 mm diameter was applied for four hours under air atmosphere. The speed of milling was fixed to 300 rpm. A composite of LiMnPO$_4$/carbon composite was then obtained.

Example 2

The LiMnPO$_4$/carbon composite (703061-P-BX1) was prepared by high energy milling under air and humidified conditions (3.2% of water). Alternatively LiOH water solution can be used.

16 g of powder of LiMnPO$_4$, 0.512 mL of water and 4 g of carbon black (Ketjenblack EC-600-JD—SSA≈1500 m$^2$/g) was placed in a 250 ml stainless steel container. A high energy milling with a planetary ball mill (Retsch PM4000) using 9 stainless steel balls of 20 mm diameter was applied for four hours under air atmosphere. The speed of milling was fixed to 300 rpm. A composite of LiMnPO$_4$/carbon composite was then obtained.

Example 3

The LiMnPO$_4$/carbon composite (703061-P-BX1-230) was prepared by high energy milling under air and humidified conditions (3.2% of water) as describe in example 2 and then dried at 230° C. overnight.

Comparative Example

The LiMnPO$_4$/carbon composite (sample A) was prepared by simple grinding of LiMnPO$_4$ with 20 weight % of carbon black under argon and then dried at 230° C. overnight.

Example 4

The LiMnPO$_4$ particles prepared as described in WO 2007/113624 was treated with manganese acetate water solution. The acetate was in following calcinations step by 400° C. decomposed to manganese oxide. The resulting LiMnPO$_4$ coated with manganese oxide layer was than coated with carbon so that the manganese oxide layer creates the interface between the active phosphate layer and carbon.

Example 5

A positive electrode composition of LiMnPO$_4$/carbon composite active material as described in example 4 was prepared by mixing of the active material (composite) with graphite (KS4 from Timcal) and a binder (polyvinylidene difluoride—PVDF) with the mass ratio (87.5:5:7.5), in N-methyl-2-pyrrolidinon. The slurry was then coated on a carbon precoated aluminium foil, serving as the current collector. The N-methyl-2-pyrrolidinon was subsequently evaporated under vacuum at 80° C. overnight. The electrode was then dry at 160° C. overnight under vacuum.

Structural Analysis of the Materials According to the Invention

Micro-Raman analyses of the materials according to the invention were performed on a multichannel Renishaw InVia Reflex spectrometer coupled with a Peltier-cooled CCD detector. Excitation was provided by the 785 nm line of a diode laser or 514.5 nm line of the Ar$^+$ laser. The samples were scanned from 100 to 3700 cm$^{-1}$ wavenumber shift at a spectral resolution of 2 cm$^{-1}$. Calibration has been carried out using the Si mode at 520.2 cm$^{-1}$. The scanning parameter for each Raman spectrum was taken usually as 10 seconds and 10 (for pure samples) to 30 (for samples with acetylene black) scans were accumulated for each experimental run to provide better signal-to-noise ratios. Multiple spot analyses were carried out on different regions of the same sample to check for spectral reproducibility.

The three samples obtained according to examples 1 to 3 were compared to samples prepared following a process known from the prior art, these samples being without carbon (pure LiMnPO$_4$).

Figure 2:
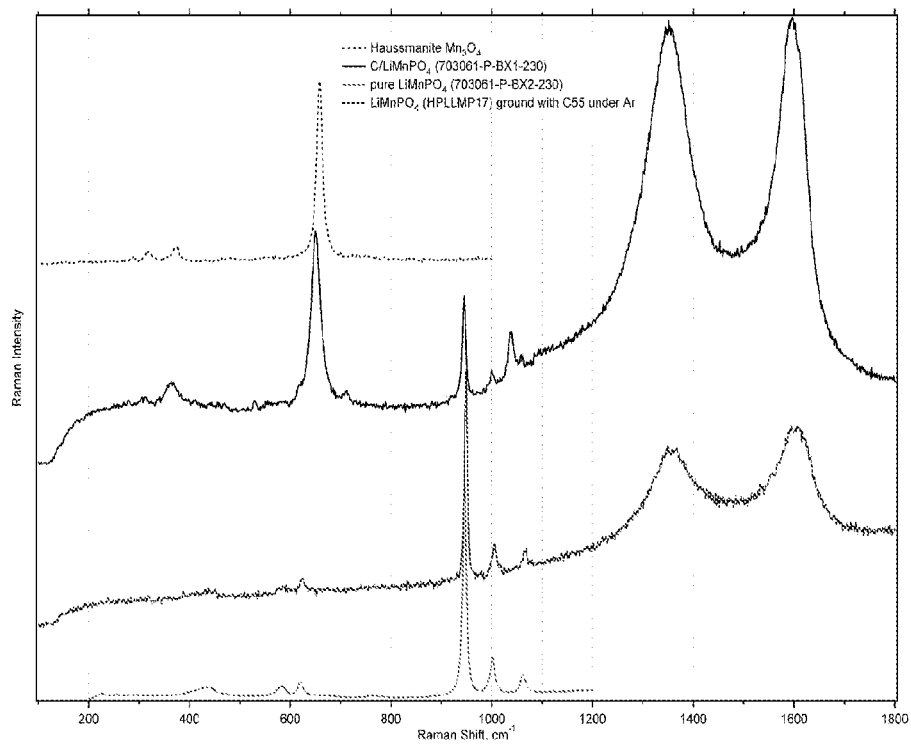
FIG. 2 shows Raman spectra of $LiMnPO_4$ grounded with carbon black under argon and dry condition, compared to pure $LiMnPO_4$, $C/LiMnPO_4$ (703061-P-BX2-230) and pure hausmannite.

The Raman spectra of all studied samples are shown in FIG. 1 and FIG. 2. The spectra of LiMnPO$_4$ are normalized for the intensity of the $v_1$ band of PO$_4$ at 945 cm$^{-1}$. The main bands of the measured samples and comparison to literature data are given in Table 2.

The spectrum of pure LiMnPO$_4$ prepared by polyol synthesis (703061-P) reveals Raman bands characteristic for this olivine-type structure[1]. The strongest band in the spectrum centred at ca. 945 cm$^{-1}$ is assigned as the $v_1$ symmetric stretching vibration of the PO$_4$ tetrahedron. In the 1000-1100 cm$^{-1}$ region weak bands can be assigned as $v_3$ antisymmetric stretching vibrations of the PO$_4$ tetrahedron (1003, 1015, 1061 and 1075 cm$^{-1}$). In the low to mid-frequency region (bellow 700 cm$^{-1}$) bending vibrations of the PO$_4$ tetrahedron appear, namely v$_2$ (symmetric) at 412 and 438 cm$^{-1}$ and v$_4$ (antisymmetric) at 620, 586 and 575 cm$^{-1}$. Very weak bands bellow 400 cm$^{-1}$ belongs to Mn—O external modes and lattice vibrations. The Li-involving motions are not allowed in Raman, since the Li cations in LiMnPO$_4$ occupy the 4a sites with C$_i$ symmetry[1].

The Raman spectra of the other two pure LiMnPO$_4$ samples (703061-P-BX2 and 703061-P-BX2-230) show a minor contamination with carbon, as documented by weak broad bands centred at ca. 1350 and 1600 cm$^{-1}$, corresponding to D and G bands, respectively of disordered carbon. Despite that, the positions and relative intensities of the LiMnPO$_4$ bands remain unchanged.

As can be seen in the FIG. 1, the spectra of LiMnPO$_4$-Carbon composite (LiMnPO$_4$—C) samples show the presence of at least 3 distinct phases:

Disordered carbon with D and G bands centred at ca. 1350 and 1600 cm$^{-1}$, respectively. LiMnPO$_4$ with the bands as stated above for the phase pure material.

Unknown phase(s) characterized mainly by the presence of a strong band at 650-665 cm$^{-1}$ (the exact position depends on a particulate grain and especially on the laser power) and weak bands at ca. 315, 370, 475, 525 and 720 cm$^{-1}$. In the higher frequency region a new band at ca. 1040 cm$^{-1}$ appears.

As can be seen from FIG. 1 and Table 2, the band positions of Mn$_3$O$_4$ hausmannite correspond exactly to most of those of the unknown phase in LiMnPO$_4$/C. Comparison to literature data supports this assignment, the variation in the 655 cm$^{-1}$ band position (Mn$^{II}$—O stretching vibration) was observed previously[22-24]. However, Mn$_3$O$_4$ is known to be one of the most stable manganese oxides under the laser beam, therefore the presence of e.g. β-MnO$_2$ (pyrolusite) MnO (manganosit), MnOOH (groutit) or Mn1.85O.6H$_2$O (birnessite) can not be excluded. The remaining unassigned bands in the spectra of LiMnPO$_4$/C at ca. 525 and 715 cm$^{-1}$ may be attributed to these oxides[3].

So, the three samples prepared according to the invention (examples 1 to 3) show an intermediate layer constituted of manganese oxide. In fact, the presence of a third phase (besides LiMnPO$_4$ and carbon black) is unambiguously evidenced from the presented data and also from our previous measurements on different sample batches.

A clear increase of the intensity of the band at 655 cm$^{-1}$ may be observed in the series: 703061-P-BX3 (example 1)→703061-P-BX3-230 (dried condition, dried at 230° C.)→703061-P-BX1 (example 2)→703061-P-BX1-230 (example 3), which means that the relative content of the unknown phase is the higher for the samples ball-milled in humid conditions (example 2) and also higher when dried at 230° C. overnight (example 3).

Functional Analysis of the Materials According to the Invention

The materials described in the present invention were used to formulate a cathode electrode. The electrode for electrochemical testing was prepared by tape casting a N-methyl pyrrolidone (NMP) slurry of the LiMnPO$_4$/C material (90 wt %) with poly(vinylidene fluoride) (PVdF) binder (5 wt %) and acetylene black (5 wt %) on an aluminium current collector. After drying at 160° C. under vacuum, the electrodes were compressed into 23 mm φ disks with a thickness of 50-60 μm, the active material loading being 8 mg/cm$^2$. The cells were assembled in Swagelok™ fittings using Li metal foil as the counter electrode with a microporous polymer separator (Celgard 2400™) and liquid electrolyte mixtures containing 1M LiPF$_6$ in a solvent mixture of propylene carbonate (PC), ethylene carbonate (EC) and dimethyl carbonate (DMC) (1:1:3 by volume). The electrochemical properties of LiMnPO$_4$ electrodes were measured by galvanostatic charge/discharge and cyclic voltammetry using an Arbin BT 2000 electrochemical measurement system.

Figure 3:
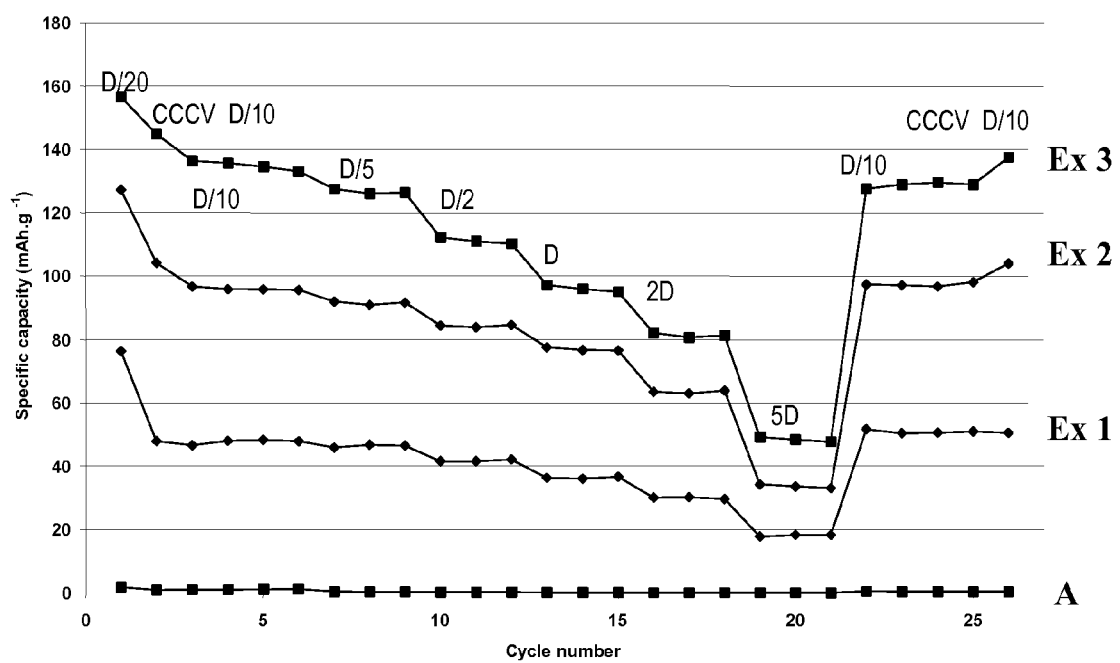
FIG. 3 shows the electrochemical performances of carbon coated $LiMnPO_4$ active material prepared according to the invention and a comparison to a mixture of $LiMnPO_4$ and carbon known from the prior art.

In the FIG. 3 can be seen the electrochemical performance at different discharging rates for the three samples according to examples 1 to 3. These samples were compared to a sample A which is a mixture of LiMnPO$_4$ and carbon (no coating process) prepared following a process known from the prior art.

As can be seen from FIG. 3, the LiMnPO$_4$/C cathode material of curve 1 prepared as show in the Comparative example which contains no detectable manganese oxide (haussmanite) see FIG. 2 at the LiMnPO$_4$/carbon interface shows very low electrochemical performance. LiMnPO$_4$/C cathode materials according to the invention are shown in curves 2-4. The material realized according to example 2 show electrochemical performance superior to the one prepared according to the example 1. The material realized according to example 3 show electrochemical performance superior to the one prepared according to the example 2. So, the electrochemical performances of the three samples (examples 1 to 3) having an increasing concentration of manganese oxides (hausmannite) as detected in FIG. 1 are improved.

We can conclude that the LiMnPO$_4$/C material prepared by high energy milling both under air and wet conditions and then dried at 230° C. (example 3) shows the best electrochemical performances.

REFERENCES

1. A. K. Padhi, K. S. Nanjundaswamy, and J. B. Goodenough, *J. Electrochem. Soc.* 144, (4), 1188-1194 (1997).
2. A. Yamada, and S. C. Chung, *J. Electrochem. Soc.* 148, (8), A960-A967 (2001).
3. C. Delacourt, L. Laffont, R. Bouchet, C. Wurm, J. B. Leriche, M. Morcrette, J. M. Tarascon, and C. Masquelier, *J. Electrochem. Soc.* 152, (5), A913-A921 (2005).
4. M. Yonemura, A. Yamada, Y. Takei, N. Sonoyama, and R. Kanno, *J. Electrochem. Soc.* 151, (9), A1352-A1356 (2004).
5. C. H. Chen, J. T. Vaughey, A. N. Jansen, D. W. Dees, A. J. Kahaian, T. Goacher, and M. M. Thackeray, *J. Electrochem. Soc.* 148, (1), A102-A104 (2001).
6. S. Q. Shi, L. J. Liu, C. Y. Ouyang, D. S. Wang, Z. X. Wang, L. Q. Chen, and X. J. Huang, *Phys. Rev. B* 68, (19),— (2003).
7. S. Y. Chung, J. T. Bloking, and Y. M. Chiang, *Nature Mater.* 1, (2), 123-128 (2002).
8. P. S. Herle, B. Ellis, N. Coombs, and L. F. Nazar, *Nature Mater.* 3, (3), 147-152 (2004).
9. A. Yamada, S. C. Chung, and K. Hinokuma, *J. Electrochem. Soc.* 148, (3), A224-A229 (2001).
10. P. P. Prosini, M. Carewska, S. Scaccia, P. Wisniewski, and M. Pasquali, *Electrochim. Acta* 48, (28), 4205-4211 (2003).
11. C. H. Mi, X. B. Zhao, G. S. Cao, and J. P. Tu, *J. Electrochem. Soc.* 152, (3), A483-A487 (2005).
12. S. T. Myung, S. Komaba, N. Hirosaki, H. Yashiro, and N. Kumagai, *Electrochim. Acta* 49, (24), 4213-4222 (2004).
13. H. Huang, S. C. Yin, and L. F. Nazar, *Electrochem. Solid-State Lett.* 4, (10), A170-A172 (2001).
14. C. Delacourt, P. Poizot, M. Morcrette, J. M. Tarascon, and C. Masquelier, *Chem. Mater.* 16, (1), 93-99 (2004).

15. N.-H. Kwon, T. Drezen, I. Exnar, I. Teerlinck, M. Isono, M. Graetzel, *Electrochemical and Solid-State Letters* 9, (6), A277-A280 (2006).
16. G. T. K. Fey, R. F. Shiu, V. Subramanian, and C. L. Chen, *Solid State Ionics* 148, (3-4), 291-298 (2002).
17. Y. Q. Hu, M. M. Doeff, R. Kostecki, and R. Finones, *J. Electrochem. Soc.* 151, (8), A1279-A1285 (2004).
18. P. P. Prosini, M. Lisi, D. Zane, and M. Pasquali, *Solid State Ionics* 148, (1-2), 45-51 (2002).
19. R. Yazami, N. Lebrun, M. Bonneau, and M. Molteni, *J. Power Sources* 54, (2), 389-392 (1995).
20. V. Srinivasan, and J. Newman, *J. Electrochem. Soc.* 151, (10), A1517-A1529 (2004).
21. A. S. Andersson, and J. O. Thomas, *J. Power Sources* 97-8, 498-502 (2001).
22. Julien, C. M.; Massot, M.; Poinsignon, C. Lattice vibrations of manganese oxides—Part 1. Periodic structures. *Spectrochimica Acta Part A-Molecular and Biomolecular Spectroscopy* 60, (3), 689-700 (2004).
23. Bernard, M. C.; Goff, A. H. L.; Thi, B. V.; Detorresi, S. C. Electrochromic Reactions in Manganese Oxides. 1. Raman Analysis. *J. Electrochem. Soc.* 140, (11), 3065-3070 (1993).
24. Lutz, H. D.; Muller, B.; Steiner, H. J. Lattice Vibration-Spectra. 59. Single-Crystal Infrared and Raman Studies of Spinel Type Oxides. *Journal of Solid State Chemistry* 90, (1), 54-60 (1991).

The invention claimed is:

1. An electroactive carbon coated material having the chemical formula $C/LiMnPO_4$ or $C/LiMn_{1-x}Z_xPO_4$, where Z=Fe, Co, Ni, Mg, Ca, Al, Zr, V, Ti and x=0.01-0.3, characterized in that it comprises a manganese oxide interface layer between the $LiMnPO_4$ material or the $LiMn_{1-x}Z_xPO_4$ material, and the carbon layer.

2. The electroactive carbon coated material according to claim 1 wherein the manganese oxide layer is either $Mn_3O_4$ (hausmannite), $\beta$-$MnO_2$ (pyrolusite), MnO (manganosit), MnOOH (groutit), or $Mn1.85O.6H_2O$ (birnessite).

3. The electroactive carbon coated material according to claim 1 or 2 wherein the concentration of manganese oxide is 0.01-5%.

4. A rechargeable battery comprising the material of claim 1.

5. An electrochemical device comprising: (a) an anode, a cathode, and an electrolyte in contact with and separating the anode and cathode; (b) a cathode current collector in electronic communication with the cathode; and (c) an anode current collector in electronic communication with the anode, wherein at least one of the anode and cathode is comprised of the electroactive carbon coated material of claim 1.

6. A process for manufacturing an electroactive carbon coated material comprising milling particles off $LiMnPO_4$ or $C/LiMn_{1-x}Z_xPO_4$ with carbon under an air atmosphere to form the electroactive carbon coated material which has the chemical formula $C/LiMnPo_4$, where Z=Fe, Co, Ni, Mg, Ca, Al, Zr, V, Ti and x=0.01-0.3, that is comprised of a manganese oxide interface layer between the $LiMnPO_4$ material or the $LiMn_{1-x}Z_xPO_4$ material, and the carbon layer.

7. The process according to claim 6 wherein said milling is carried out under wet conditions.

8. The process according to claim 7 wherein said milling is followed by a heat treatment from 130° C. to 300° C., preferably from 200° C. to 250° C.

9. The process according to claim 6, wherein the manganese oxide layer is prepared by oxidizing $LiMnPO_4$.

10. The process of claim 6, wherein the milling is high energy milling.

11. The process of claim 7, wherein the water content is 0.5-20%.

12. The process of claim 6, wherein the process is carried out with addition of a LiOH.solution.

* * * * *